United States Patent [19]

Tanaka et al.

[11] Patent Number: 5,488,718
[45] Date of Patent: Jan. 30, 1996

[54] RECORDING AND REPRODUCING METHOD IN WHICH DATA AND UPDATING DATA ARE RECORDED IN A SECTOR OF A SELECTED BLOCK OF A RECORDING MEDIUM IN A PREDETERMINED ORDER WITHOUT RECORDING A DIRECTORY

[75] Inventors: Hirokazu Tanaka, Yokohama; Keiji Tsuchiya, Kawasaki, both of Japan

[73] Assignee: Canon Kabushiki Kaisha, Tokyo, Japan

[21] Appl. No.: 66,447

[22] Filed: May 25, 1993

[30] Foreign Application Priority Data

May 27, 1992 [JP] Japan .................................. 4-158892

[51] Int. Cl.$^6$ .................................................. G06F 17/30
[52] U.S. Cl. ................ 395/600; 369/275.3; 364/DIG. 1; 364/283.1
[58] Field of Search ............................. 395/600; 369/58, 369/59, 275.1, 275.3

[56] References Cited

U.S. PATENT DOCUMENTS

| | | | |
|---|---|---|---|
| 3,668,647 | 6/1972 | Evangelisti et al. | 395/600 |
| 4,780,816 | 10/1988 | Connell | 395/600 |
| 4,953,122 | 8/1990 | Williams | 395/600 |
| 4,998,009 | 3/1991 | Iijima et al. | 235/487 |
| 5,355,481 | 10/1994 | Sluijter | 395/600 |

FOREIGN PATENT DOCUMENTS

| | | |
|---|---|---|
| 0251666 | 1/1988 | European Pat. Off. . |
| 0286308 | 10/1988 | European Pat. Off. . |
| 0300457 | 1/1989 | European Pat. Off. . |
| 0303377 | 2/1989 | European Pat. Off. . |
| 0355620 | 2/1990 | European Pat. Off. . |
| 0461831 | 12/1991 | European Pat. Off. . |
| 0469931 | 2/1992 | European Pat. Off. . |

*Primary Examiner*—Thomas G. Black
*Assistant Examiner*—John C. Loomis
*Attorney, Agent, or Firm*—Fitzpatrick, Cella, Harper & Scinto

[57] ABSTRACT

A method for recording a plurality of kinds of data to a recording medium such as an optical card or disc having a recording surface on which a plurality of sectors are arranged in accordance with a predetermined order and for reproducing the recorded data is provided. A plurality of blocks each of which includes a plurality of sectors and which correspond to the kinds of data are prepared for the recording surface. One of the plurality of blocks is accessed on the basis of the kind of data. In the accessed block, data is recorded onto at least one sector in accordance with the predetermined order. In the accessed block, updating data is additionally recorded onto at least one sector subsequent to the data recorded sector. In the accessed block, the recorded data is reproduced from at least one of the finally recorded sectors. A plurality of tracks each comprising a plurality of sectors are arranged in parallel on the recording surface of the optical card. The data is recorded and reproduced by scanning the recording surface of the optical card by a light beam. Since there is no need to read out any directory to manage the recording and reproduction of data, the complicated seeking operation of the recording and reproducing head is unnecessary and the accessing time is reduced.

4 Claims, 5 Drawing Sheets

| FILE NAME | FILE LENGTH | LEADING DATA TRACK NO. |

| FILE NAME | FILE LENGTH | LEADING DATA TRACK NO. | BLOCK POSITION |

# 5,488,718

RECORDING AND REPRODUCING METHOD IN WHICH DATA AND UPDATING DATA ARE RECORDED IN A SECTOR OF A SELECTED BLOCK OF A RECORDING MEDIUM IN A PREDETERMINED ORDER WITHOUT RECORDING A DIRECTORY

BACKGROUND OF THE INVENTION

1. Field of the Invention

The present invention relates to a method for recording a plurality of kinds of data on an information recording median and for reproducing the recorded data.

2. Related Background Art

Hitherto, as information recording media, a floppy disk for recording and reproducing information by using magnetism, a card-shaped optical information recording median (hereinafter, referred to as an optical card) for recording and reproducing information by using light, and the like are known. To manage the information of those information recording media, auxiliary data comprising a directory is used to manage the data for every file, in order to store a large capacity of data. As shown in FIG. 1, generally, file information such as a file name, file length, leading data track number, and the like are written into the directory and a file management of a data track portion is executed.

In general, the foregoing optical card, particularly, an unerasable write once type optical card has a size near a credit card. In spite of such a small size, the optical card has a large recording capacity. The dimensions of a credit card are set to about 85 mm×55 mm. Now, assuming that an information track pitch is set to 20 μm and a recording length of one bit is set to 5 μm, The number of tracks: $55/(20\times10^{-3})=2750$ Bit capacity/track: $85/(5\times10^{-3})=17000$ (bits)

Byte capacity/track: $17000/8=2000$ (bytes)

To manage such a large capacity of information, a managing method of information by the directory is needed.

FIG. 2 is a schematic plan view showing an example of an optical card. In FIG. 2, an optical card 1 has a data portion 10 ($10_1, 10_2, \ldots, 10_n$) comprising data tracks and a directory portion 20 ($20_1, 20_2, \ldots, 20_n$). In a case of recording information on the optical card 1, data is written into the data portion 10 from the upper portion in the direction indicated by an arrow E. Directory information as data management information is written into the directory portion 20 from the lower portion of the optical card 1 in the direction indicated by an arrow D in a write-once manner.

The data recording method as shown in FIG. 2, is a relatively suitable method because the number of directories is small when handling a file of a relatively large file size. In a case of recording a number of files each having a very small size, however, the number of directories increases in accordance with such a large number of files, so that there is a problem such that when data is reproduced, a reading time of the directory becomes long, so that an accessing time increases. On the other hand, even when data is recorded or is logically rewritten, the corresponding directory must be recorded into the directory portion, so that there is a problem such that the seeking operation of the recording and reproducing head of the recording and reproducing apparatus is complicated.

Further, according to the data recording method shown in FIG. 2, since the data files are written in the E direction shown in FIG. 2, the necessary files are not always arranged in accordance with the correct order upon reproduction. For example, when it is now assumed that there is an information recording medium on which a certain doctor has recorded data such as electrocardiogram information and electroencephalogram information of a patient for a period of ages from 1 to 15, the electrocardiogram information and electroencephalogram information at the age of one year of the patient, the electrocardiogram information and electroencephalogram information at the age of two years, and the like have once been written on the information recording medium. When the user tries to reproduce only the electrocardiogram information from the information recording medium, the data files are accessed in a skipping manner. Therefore, there is a problem such that the accessing time is longer than that in the case where only the electrocardiogram information has sequentially been once written. On the other hand, in the case where a region in/from which no information can be recorded or reproduced exists in the information recording medium because there is a large defect in the medium, it is difficult to use the medium while avoiding such a region by the conventional method in spite of the fact that such a using method is desirable to improve a recording or reproducing speed.

To solve such a problem, there has been proposed an example in which a plurality of blocks are provided, in which each block has a data portion to record a data file and a directory portion to record directory information in order to manage the data files as shown in U.S. Pat. No. 4,998,009 (corresponding to European Patent No. 286308). The above method will now be described with reference to FIG. 3. In FIG. 3, reference numerals $50_n, 50_{n+1}, \ldots, 50_{n+n}$ denote blocks which are arranged on the optical card 1; $60_{n1}, 60_{n2}, \ldots, 60_{nn}$ indicate information recording areas (data portions to record data files) of the block $50_n$; and $70_{n1}, 70_{n2}, \ldots, 70_{nn}$ show directory areas of the same block $50_n$, respectively. A plurality of blocks $50_{n+1}, \ldots, 50_{n+n}$ each having a construction similar to the block $50_n$ are arranged on the optical card 1. The directories to manage the data files are also recorded in the same block. The user who uses the information recording medium can select a desired block. An information retrieving speed can be increased by such a selection.

According to the above method, when it is now assumed that there is an information recording medium such that a doctor tries to record electrocardiogram information into the block $50_n$ and electroencephalogram information into the block $50_{n+1}$ and that the doctor wants to reproduce only the electrocardiogram information from the information recording medium, the data can be continuously reproduced in the block $50_n$. Therefore, an accessing time can be reduced On the other hand, as shown in FIG. 3, when the presence of a defect 80 is detected, the blocks can be arranged so as to avoid such a defect 80.

According to the data recording method shown in FIG. 3, however, by dividing the data portion into a plurality of blocks, the data to be recorded can be recorded in a state in which the data can be easily read out by the will of the user in accordance with a situation of using the information. However, since information such as leading data track number and the like of the data file has been recorded in the directory information, the directory must be read before the data file is reproduced. Moreover, since the directories have been distributed and recorded into the blocks in the optical card, there is a problem such that a reading time of the directories is long and a data reproducing time is also long.

SUMMARY OF THE INVENTION

The present invention is made to solve the problems of the above conventional technique and it is an object of the invention to provide a data recording and reproducing method whereby by managing the recording and reproducing operations of information without using directories, even when a number of files each having a small file size are recorded, the reading operation of the directories is eliminated, the complicated seeking operation of a recording and reproducing head is also eliminated, and an accessing time can be reduced.

Another object of the invention is to provide a data-recording method wherein by recording directory information in a lump into one block, a reading time of the directory information can be remarkably reduced.

The above objects of the present invention are accomplished by a method for recording a plurality of kinds of data on a recording medium having a recording surface on which a plurality of sectors are arranged in accordance with a predetermined order and for reproducing the recorded data, wherein the method comprises the steps of: preparing a plurality of blocks each of which includes a plurality of sectors and which correspond to the kinds of data on the recording surface; accessing one of the plurality of blocks on the basis of the kind of data; recording data onto at least one sector in the accessed block in accordance with the predetermined order; additionally recording updating data into at least one sector subsequent to the data recorded sector in the accessed block in accordance with the predetermined order; and reproducing the data from at least one of the finally recorded sectors in the accessed block.

The above objects of the present invention are also accomplished by another method for recording a plurality of kinds of data on a recording medium having a recording surface on which a plurality of sectors are arranged in accordance with a predetermined order and for reproducing the recorded data, wherein the method comprises the steps of: preparing a plurality of blocks each including a plurality of sectors onto the recording surface, in which corresponding several kinds among the kinds of data have been predetermined; accessing one of the plurality of blocks on the basis of the kind of data; recording data to which attribute information indicative of the kind of data has been added on at least one sector in the accessed block in accordance with the predetermined order; additionally recording updating data to which the attribute information has been added on at least one sector subsequent to the data recorded sector in the accessed block in accordance with the predetermined order; and reproducing the desired kind of data as finally recorded data from the recorded data in the accessed block on the basis of the attribute information added to each data.

The above objects of the invention are also accomplished by still another method for recording a plurality of kinds of data onto a recording medium having a recording surface on which a plurality of sectors have been arranged in accordance with a predetermined order, comprising the steps of: preparing a plurality of data blocks each of which includes a plurality of sectors and which correspond to kinds of data for the recording surface;

preparing a single directory block including a plurality of sectors for an area different from the data blocks on the recording surface; accessing one of the plurality of blocks on the basis of the kind of data; recording data on at least one sector in the accessed block; and recording a directory to manage the data on at least one sector in the directory block, wherein the directory corresponding to the data recorded in any one of the data blocks is also recorded on the single directory block.

DETAILED DESCRIPTION OF THE PREFERRED EMBODIMENTS

Figures 1, 2:
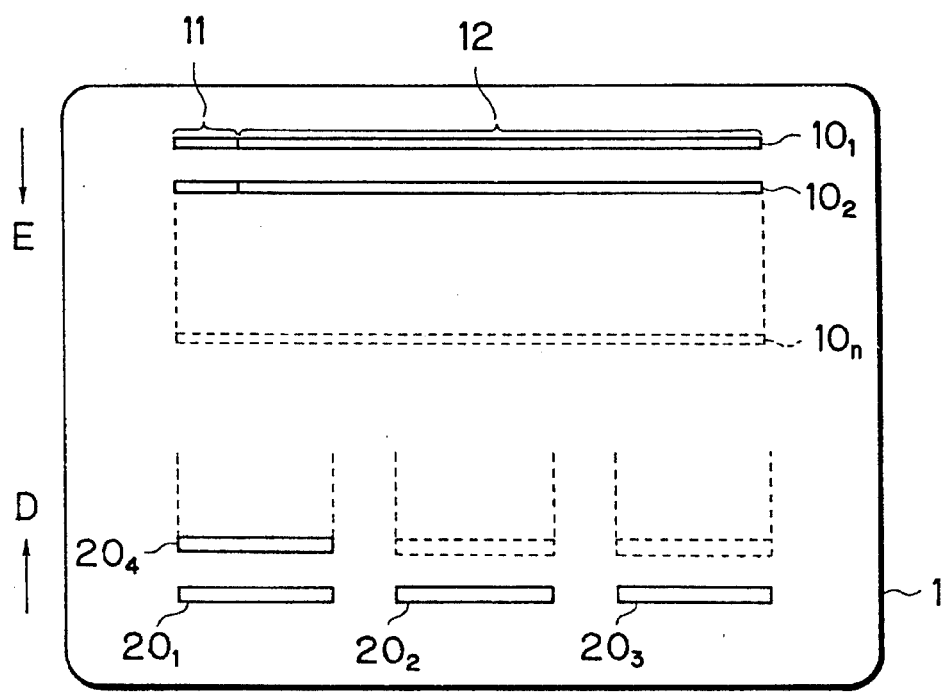
FIG. 1 is a schematic diagram showing a construction of a conventional directory.
FIG. 2 is a schematic plan view of a recording medium for explaining an example of a conventional data recording and reproducing method.
Figure 3:
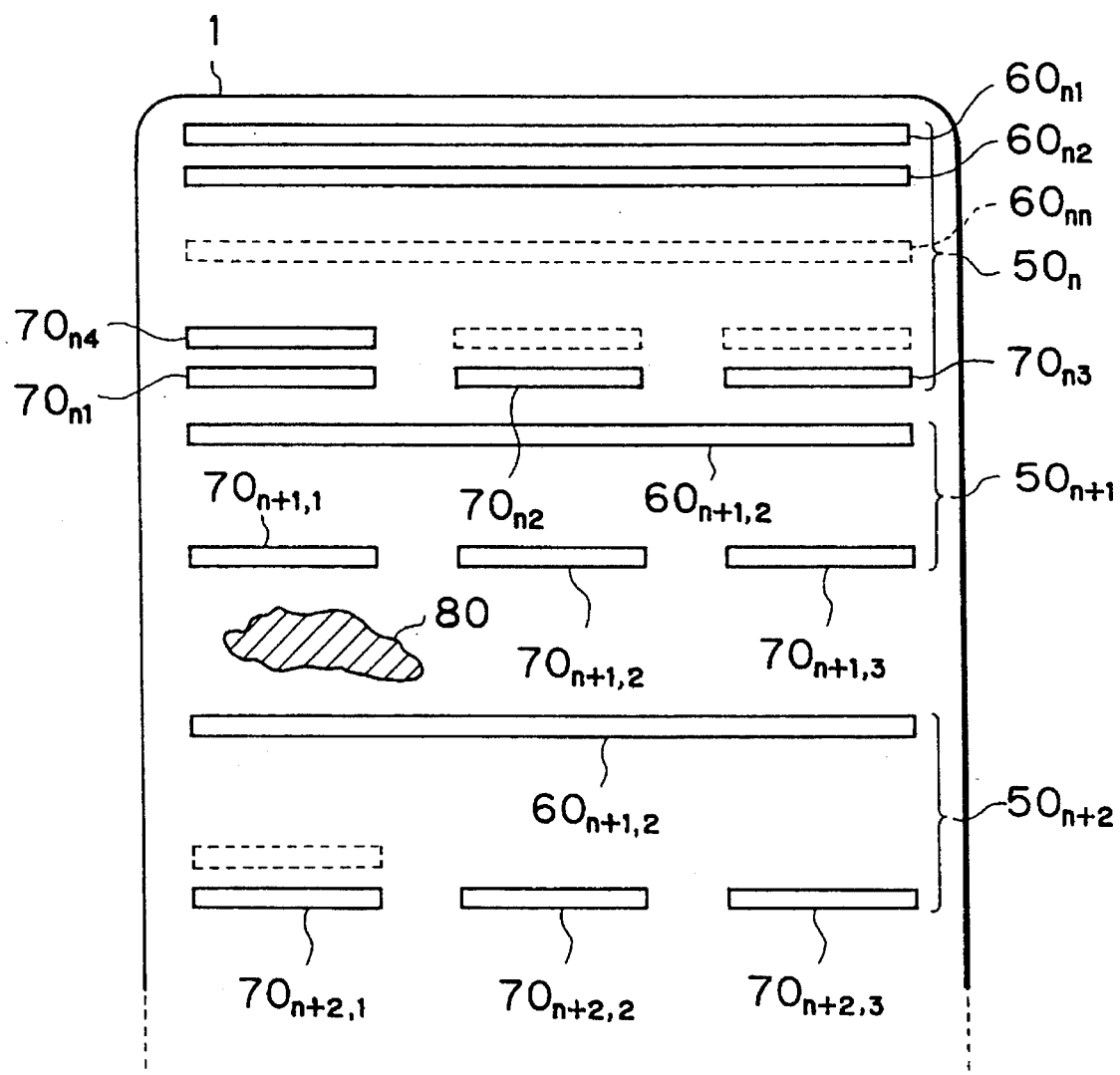
FIG. 3 is a schematic plan view of a recording medium for explaining another example of a conventional data recording and reproducing method.
Figure 4:
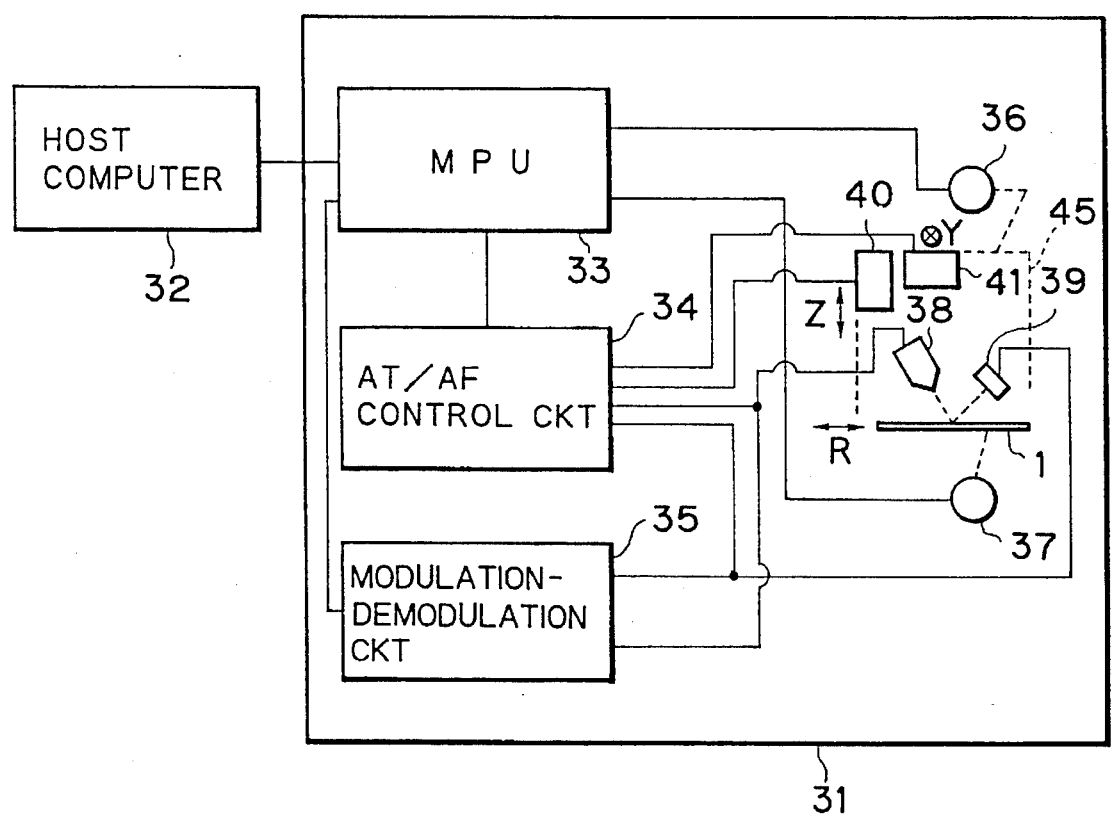
FIG. 4 is a block diagram showing a construction of an apparatus which is used to embody a data recording and reproducing method according to the present invention.

An embodiment of the present invention will be described in detail with reference to the drawings. In the following description, it is now assumed that a write once type optical card is mentioned as an example of an information recording medium. First, an example of a construction of an information recording and reproducing apparatus which is used ill a data recording and reproducing method of the invention will now be described with reference to FIG. 4. In FIG. 4, reference numeral 31 denotes an information recording and reproducing apparatus ( hereinafter, simply referred to as a drive) to record or reproduce information onto/from the optical card 1. The drive 31 is connected to a host computer 32 as a higher-order control apparatus. Reference numeral 37 denotes a card feed motor for feeding the optical card 1 into the drive through a conveying mechanism (not shown), for reciprocating the optical card in the directions indicated by arrows R by a predetermined drive, and further for ejecting the optical card out of the apparatus. Reference numeral 38 denotes a light beam irradiation optical system including a light source. In the information recording mode or information reproducing mode, a light beam spot is formed onto the optical card 1 by the light beam irradiation optical system 38. Reference numeral 39 denotes a photodetector to receive and detect the reflected light of the light beam spot; 40 an AF actuator for moving a part of the optical system 38 and moving an in-focus position of the light beam spot on the surface of the optical card 1 in the direction indicated by an arrow Z, namely, in the direction perpendicular to the surface of the optical card 1, thereby executing an automatic focusing (AF) operation; and 41 an AT actuator for driving a part of the optical system 38 and moving the light beam spot on the optical card 1 in the direction indicated by an arrow Y, namely, the direction perpendicular to both of the R and Z directions, thereby executing an automatic tracking (AT) operation.

An optical head 45 is constructed by integratedly assembling the light beam irradiation optical system 38, photodetector 39, AF actuator 40, and AT actuator 41 mentioned above. Reference numeral 36 denotes a drive motor for moving the optical head 45 in the Y direction, thereby accessing the light beam spot onto a desired track on the optical card 1. Reference numeral 33 denotes a microprocessing unit (MPU) having therein a read only memory (ROM) and a random access memory (RAM). The MPU 33 controls the card feed motor 37 and head feed motor 36 and executes a communication of data between the MPU and the host computer 32, a control, and the like by the control of the host computer 32. An AT/AF control circuit 34 receives a detection signal from the photodetector 39 and drives the AF actuator 40 and AT actuator 41, thereby performing the AF control and AT control. Thus, the light beam spot is scanned on the information track while being focused onto the recording surface of the optical card 1. In the information reproducing mode, the output of the photodetector 39 is supplied to a modulation-demodulation circuit 35, by which the read information is demodulated and reproduction data is produced. The obtained reproduction data is sent to the MPU 33 and is further transferred from the MPU 33 to the host computer 32.

The modulation-demodulation circuit 35 modulates the information signal sent from the MPU 33 in the information recording mode. The light beam irradiation optical system 38 is driven in accordance with the modulated signal, thereby recording the information. In the reproducing mode, the data is demodulated on the basis of the output signal of the photodetector 39 as mentioned above. The host computer 32 transmits and receives data to/from the drive 31 and instructs the drive 31 to record or reproduce the information for every data track of the optical card 1. Generally, since an error rate of the optical card is high in terms of the nature of the medium, when information of a high reliability is required, error correcting means is additionally necessary.

Figure 5:
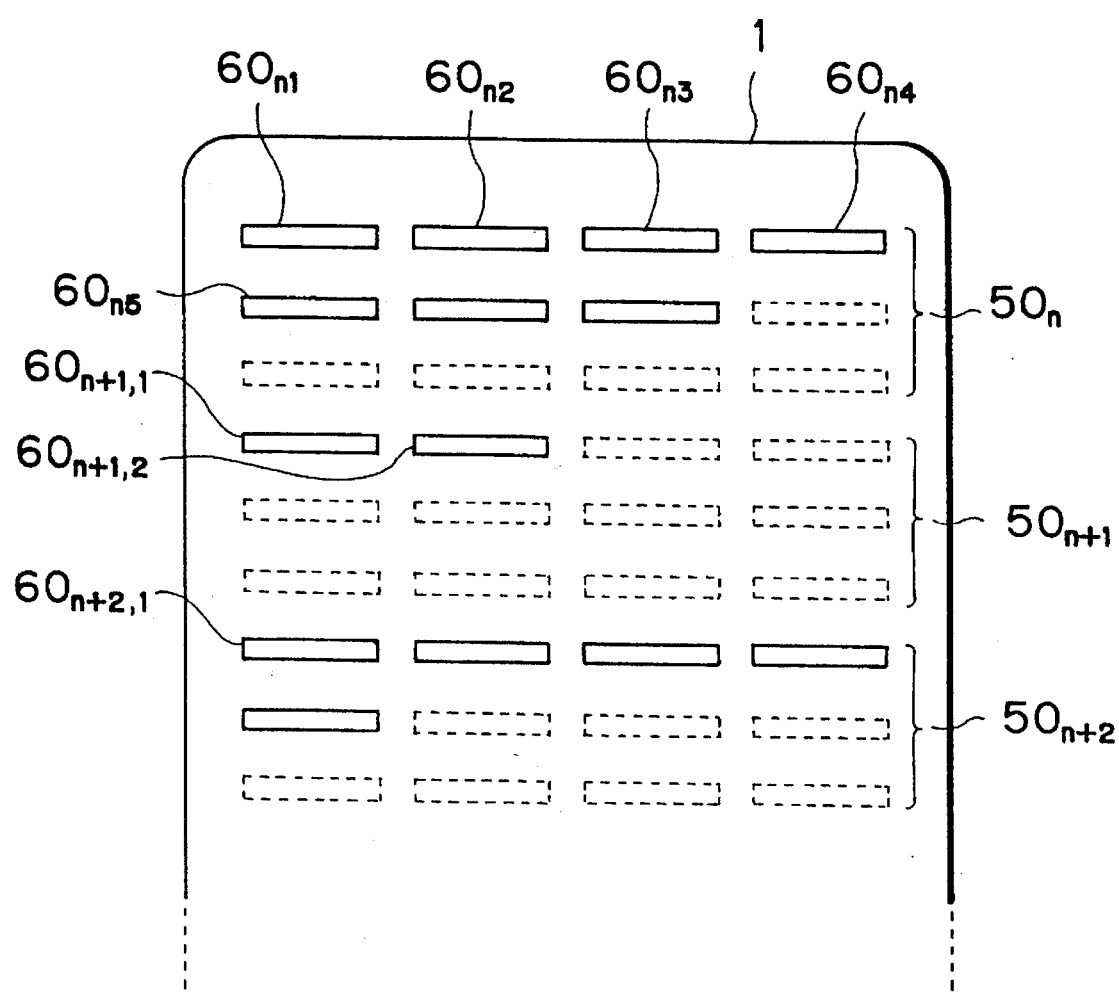
FIG. 5 is a schematic plan view of a recording medium for explaining the first embodiment of the data recording and reproducing method of the invention.

An embodiment of the data recording and reproducing method of the invention will now be described. FIG. 5 is a schematic diagram showing the recording surface of the optical card for explaining the method of the embodiment. In FIG. 5, reference numerals $50_n$, $50_{n+1}$, and $50_{n+2}$ denote the blocks which are constructed by three information tracks. Those blocks are divided in correspondence to the kinds of data, respectively. Reference numerals $60_{n1}$, $60_{n2}$, ..., $60_{nn}$ denote the sectors obtained by dividing the three information tracks. The sector number of the sector $60_{n1}$ is smallest and the sector numbers of the other sectors sequentially increase. The blocks $50_{n+1}$ and $50_{n+2}$ are also constructed in a manner similar to the block $50_n$. In FIG. 5, three information tracks have been set into one block. However, one information track is set into one block for convenience of explanation hereinafter. In this case, the block number coincides with the track number and each track is used as a special recording area of the corresponding data.

In the embodiment, first, in a case of recording data, the host computer 32 shown in FIG. 4 obtains the track number to be recorded from the number of the block corresponding to the kind of data to be recorded and informs the MPU 33 in the drive 31. Since the block number coincides with the track number here, the host computer 32 easily informs the track number. For example, now assuming that the kind of data to be recorded corresponds to the information track (block) of the top column in FIG. 5, the host computer 32 informs the track number of such a track to the MPU 33. The MPU 33 controls each section such as a card feed motor 37, head feed motor 36, and the like and reads out the data which has already been recorded before on the information track designated from the host computer 32 and transfers the obtained data to the host computer 32. The host computer 32 checks the unrecorded sectors from the data received and notifies the sector numbers and data to the MPU 33 in order to record the data in accordance with the order from the small sector number among the unrecorded sectors. For example, when it is now assumed that the sector $60_{n1}$ of the information track of the top column in FIG. 5 is the recorded sector and the remaining sectors are the unrecorded sectors, the host computer 32 notifies the sector number of the next sector $60_{n2}$ of the recorded sector $60_{n1}$ to the MPU 33 as a sector to subsequently record data. The MPU 33 controls each section and records the transferred data to the sector $60_{n2}$ designated by the host computer 32. The data recorded as mentioned above is the newest data in the block. In a case of recording a plurality of kinds of data into one block, attribute information indicative of the kind of data is added.

The logical rewriting (updating) operation of data can be also performed in a manner similar to the recording of information described above. That is, the recording and rewriting operations of data can be controlled by the same algorithm. This is because the positions at which data is recorded are limited in the corresponding block and, upon reproduction, the data recorded at last is used as reproduction data as will be explained hereinafter. When information is recorded or rewritten, it is necessary to once read out the data on the information track corresponding to the data and to search the recording position. However, since it is sufficient to execute only one seeking operation of the optical head 45, the accessing time can be reduced as compared with that by the conventional method whereby directories are recorded. As for the rewriting of data, since the number of sectors in the block is limited, when all of the sectors in the block have been recorded, no data can be further rewritten any more. Therefore, it is desirable to decide the number of sectors per one track and the number of tracks per one block in consideration of the size of data to be recorded and the number of rewriting times.

On the other hand, in case of reproducing data, the host computer 32 obtains the track number from the number of the block corresponding to the kind of data to be reproduced and notifies the MPU 33. For example, when it is now assumed that the kind of data to be reproduced corresponds to the information track (block) of the top column in FIG. 5, the MPU 33 controls each section and reads out the data of the information track of the top column designated and transfers the obtained data to the host computer 32. The host computer 32 extracts the data of the finally recorded sector from among the data received and uses the extracted data as reproduction data. Namely, since the finally recorded data is the newest data, the host computer extracts the data of the finally recorded sector as reproduction data. For example, a s mentioned above, in the information track of the top column in FIG. 5, since the sectors $60_{n1}$ and $60_{n2}$ are the recorded sectors, the data of those two sectors is transferred to the host computer 32. However, since the data of the sector $60_{n2}$ which has finally been recorded in the block is the newest data, the host computer 32 takes out the newest data as reproduction data. In the case where a plurality of kinds of data have been recorded in one block, the data of the finally recorded sector among the sectors to which the attribute information indicative of the kind of data to be reproduced is taken out as reproduction data from the data transferred to the host computer 32.

According to the embodiment as mentioned above, by managing the recording and reproducing operations of information without using any directory, not only is the time to reproduce the directory portion before information is reproduced unnecessary, but also the seeking operation such that the optical head reciprocates between the data portion and the directory portion in the recording mode of information is also unnecessary, so that the accessing time can be remarkably reduced as compared with that in the conventional method. Particularly, in a case of recording a number of data of a small size, there is no need to record or reproduce a directory for every data and the seeking operation of the head is also unnecessary, so that it is effective. Since the recording and rewriting operations of information can be executed by substantially the same method, the software to control the information recording and reproducing apparatus can be simplified.

The information managing method of the embodiment mentioned above can be applied to a wide range of various fields so long as it is used in an information recording and reproducing system of an optical card. For instance, in a factory or the like, personal information of the members can be recorded by making the member numbers correspond to the block numbers. By making the date correspond to the block number, the member's ID card also serving as a time card can be also formed. In a school or the like, such an optical card can be used as a student ID card in which information regarding a student or pupil or the credits obtained have been recorded. Further, in medical fields, the invention can be applied to a medical card for recording medical information of a patient. In the field of official affairs, the invention can be applied to a passport, driver's licence card, or a library rental card. In the service or industrial field, the invention can be also applied to various kinds of member cards, new media community cards, or the like. The fields of information which can be used lies within a wide range. In the future, it is presumed that an integrated system for recording and reproducing is constructed in accordance with information by hardware or software. In such a case, by using the data recording and reproducing method of the embodiment, the data accessing time can be reduced.

Figures 6, 7:
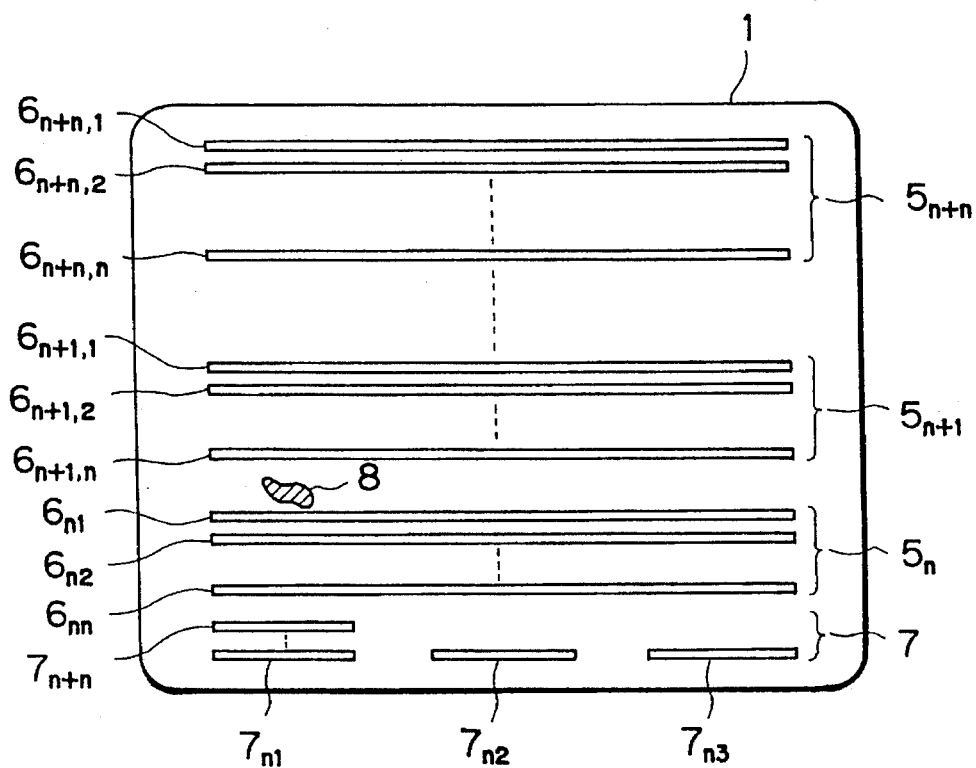
FIG. 6 is a schematic plan view of a recording medium for explaining the second embodiment of the data recording and reproducing method of the invention.
FIG. 7 is a schematic diagram showing a construction of a directory in the second embodiment.

Another embodiment of the data recording and reproducing method of the invention will now be described. FIG. 6 is a schematic diagram showing a recording surface of the optical card in order to explain the method of the embodiment. Reference numerals $5_n, 5_{n+1}, \ldots, 5_{n+n}$ denote data blocks each comprising a plurality of information tracks. A data file is recorded in the data block. Reference numerals $6_n, 6_{n1}, \ldots, 6_{nn}$ denote information recording portions in the data block $5_n$, namely, data portions to record the data file. One information recording portion is constructed by one information track. Reference numerals $6_{n+1}$ to $6_{n+1,n}$ denote information recording portions in the data block $5_{n+1}$, $6_{n+n,1}$ to $6_{n+n,n}$ indicate information recording portions in the data block $5_{n+n}$; and 7 shows a directory block to record directory information. The directory portion $7_{n1}, 7_{n2}, \ldots, 7_{n+n}$ are provided in the directory block 7 in correspondence to the information recording portions $6_{n1}$ to $6_{n+n,n}$ in the data blocks $5_n$ to $5_{n+n}$, respectively. According to the embodiment as mentioned above, the recording area of the optical card 1 is divided into a plurality of blocks. The information recording portion to record file data is provided in each block. The directory portion to record directory information is provided in one of the blocks.

FIG. 7 is a diagram showing directory information which is recorded in each directory portion. The directory information is constructed by a file name, a file length, and a leading data track number. Block position information indicating in which block the recorded data is located is added to the directory information.

In the embodiment, first, in a case of reproducing information, a reproduction command is generated from the host computer 32 shown in FIG. 4 to the drive 31. When the drive 31 receives the reproduction command, the MPU 33 first controls each section such as a card feed motor 37, a head feed motor 36, and the like and allows the optical head 45 to be moved to the block 7. The directory information in all of the directory portions in the block 7 is read out and transferred to the host computer 32. It is also possible to provide an arrangement such that when the optical card 1 is set into the drive 31, the host computer 32 instructs the drive 31 to read out all of the directory information. The computer 32 recognizes the recording position of the file data from the transferred directory information and designates the block and information recording portion to be reproduced to the drive 31. For example, when it is now assumed that the reproduction of the data of the information recording portion $6_{n1}$ of the data block $5_n$ was designated, the MPU 33 controls each section and allows the optical head 45 to be moved to the information recording portion $6_{n1}$ of the designated data block $5_n$. The instructed information is read out and the reproduction data derived is transferred to the host computer 32. In the embodiment, when the directory information is reproduced as mentioned above, the directory information is recorded in a lump in one block. Therefore, it is sufficient to execute the seeking operation of the optical head only once. The reading time of the directory information can be remarkably reduced as compared with the conventional recording method in which the directory information has been distributed.

On the contrary, in a case of recording data, the host computer 32 generates a recording command to the drive 31 and the block in which data should be recorded, the position information of the information recording portion, and the file data to be recorded are transmitted. The MPU 33 controls each section and allows the optical head 45 to be moved to the designated position, thereby recording the file data sent from the host computer 32. After completion of the recording, the MPU 33 further allows the optical head 45 to be moved to the information recording portion in the directory block 7. The directory information to manage the file data which has been recorded at present is recorded. As shown in FIG. 7, the directory information comprises information such as file name, file length, and the like. In this case, for example, when the doctor records medical information such as electrocardiogram information, electroencephalogram information, or the like as file data, so long as the block to be recorded has been predetermined in accordance with the kind of data in a manner such that the electrocardiogram information is recorded onto, for instance, the data block $5_n$ shown in FIG. 6 or the like, it is sufficient to move the optical head in only such a block when data is recorded. The accessing time, consequently, can be reduced. For instance, when the medical information is recorded to the optical card as mentioned above, a discrimination regarding whether the shortest accessing time can be accomplished by recording which data onto which block depends on how the data is utilized. Therefore, it is desirable to predetermine a correspondence between the kind of data and the block on the basis of such conditions. With respect to the size of a block, on the other hand, it is desirable to arbitrarily set in accordance with the kind of data, namely, in accordance with the data in a manner such that data of a large data amount is recorded onto a large block and data of a small data amount is recorded onto a small block.

On the other hand, as a method of setting the blocks of the optical card, there are various kinds of setting methods in addition to the above method. For example, when optical cards are manufactured, each block is set in a form of a preformat and can be also used as a fixed block. In this case, it is effective when a method of arranging data to be handled is fixed and processes are constant. It is also possible to provide an arrangement such that the user selects such a data arranging method by using an icon of a CRT or the like by an interactive manner with a computer (work station) and the user selects and manages the data by himself. In the embodiment, in the case where a large defect 8 exists in the optical card 1 as shown in FIG. 6, the blocks can be also arranged so as to avoid such a defect. That is, in the case where the user arbitrarily sets a block from the host computer 32, the position of the defect is examined. When the presence of a defect is detected, the block can be set so as to avoid the defect 8 as shown in FIG. 6.

The data recording and reproducing method of the embodiment can be applied to various kinds of fields and a data retrieving speed can be also increased in accordance with the data to be handled. For example, in the publishing field, the invention can be applied to an electronic publication. A target for publication is not limited to only character information or the like but a computer software publication, a graphic software publication, or the like can be considered. In the medical field, as mentioned above, the invention can be also applied to a medical card in which all of the data necessary for medical work such as personal information like address, name, age, blood type, etc. of the patient, kind of subscriber's insurance, past history of the patient, examination result data, diagnosis result, and the like is recorded. In the field of official affairs, further, the invention can be also applied to a passport, driver's license card, and library rental card. In the service or industrial fields, the invention can be also applied to various kinds of membership cards, education software, new media community cards, or the like. In the field of OA or FA, the invention can be applied to NC/robot control program cards, an installation apparatus maintenance card, or a service manual card. Moreover, the invention can be also applied to a member's ID card also serving as a health diagnosis recording, student ID card on which the credits obtained so far have been recorded, article flow management card, or the like.

As mentioned above, there are a variety of data to be handled by the optical card. In the future, it is presumed that an integrated system for recording and reproducing data is constructed in accordance with the data by both a hardware manner and a software manner. In such a case, according to the embodiment, the recording area of the information recording medium is divided into a plurality of blocks in which file data should be recorded, and directory information is recorded in a lump in one block. The block position information of data is added to the directory information, so that the reading time of the directory information can be extremely reduced. On the other hand, by dividing the data of the blocks in accordance with using the data in a manner such that the block is determined in accordance with a using frequency of the data, the data can be efficiently managed and a retrieving speed can be raised. For example, in the case where the data which is recorded to education software cards are such that problems of mathematics, science, language, and social science are frequently processed for every grade of each of the mathematics, science, language, and social science, it is sufficient to record the data of the mathematics, science, language, and social science of one grade into one block. On the other hand, in the case where data is frequently processed for every subject, the retrieving speed can be raised by a method whereby, for example, the problems of only mathematics of all of the grades are recorded and arranged in one block.

Although the above embodiments have been described with respect to the example in which each track comprises a plurality of sectors, the method of the invention can be also similarly applied to the case where a recording medium in which each track comprises one sector is used.

Although the optical card has been mentioned as an information recording medium in the above embodiment, the recording medium is not limited to such an optical recording medium. The invention can be also applied to, for instance, another magnetic recording medium. The recording medium is also not limited to a card-shaped medium but, for example, a disk-shaped medium or the like also can be used.

According to the present invention as described above, since the data is recorded and reproduced without using any directory, even when a number of files of a small size are recorded, a time which is required to reproduce the directory portions before the data is reproduced i s unnecessary. In addition, when data is recorded, the recording and reproducing head doesn't need to reciprocate between the data portion and the directory portion, so that the accessing time of information can be remarkably reduced. Since the directory information is recorded in a lump in one block, the time which is required to read out the directory information can be extremely reduced as compared with that in the conventional method.

What is claimed is:

1. A method of recording data on and reproducing data from a recording medium using a recording and reproducing head, the recording medium having a recording surface on which a plurality of sectors are arranged in a predetermined order, said method comprising the steps of:

preparing a plurality of blocks on the recording surface of the recording medium, each of the blocks corresponding to the contents of recording data and each including a plurality of sectors;

selecting a block, which corresponds to the content of data to be recorded, from among the plurality of blocks;

moving the recording and reproducing head to the selected block;

recording data by the recording and reproducing head on at least one sector in the selected block in accordance with a predetermined order, without recording a directory;

additionally recording updating data by the recording and reproducing head in accordance with a predetermined order in at least one sector subsequent to the sector recorded in the selected block, without recording a directory; and reading out the data from at least one sector lastly recorded in the selected block, as only data indicating the content of the data corresponding to the selected block.

2. A method according to claim 1, wherein a plurality of tracks each comprising a plurality of sectors are arranged in parallel on the recording surface of the recording medium.

3. A method according to claim 1, wherein the medium is an optical recording medium, and further comprising recording and reproducing the data by scanning the recording surface of the medium by a light beam.

4. A method according to claim 3, wherein the medium is an optical card.

* * * * *

UNITED STATES PATENT AND TRADEMARK OFFICE
CERTIFICATE OF CORRECTION

PATENT NO. : 5,488,718        Page 1 of 2
DATED : January 30, 1996
INVENTOR(S) : Hirokazu TANAKA, et al.

It is certified that error appears in the above-indentified patent and that said Letters Patent is hereby corrected as shown below:

COLUMN 1:

Line 12, "median" should read --medium--; and
    Line 17, "median" should read --medium--.

COLUMN 2:

Line 47, "reduced" should read --reduced.--.

COLUMN 4:

Line 31, "ill" should read --in--.

COLUMN 6:

Line 33, "in" should read --in a--;
    Line 46, "a" should read --as--; and
    Line 47, "s" should be deleted.

UNITED STATES PATENT AND TRADEMARK OFFICE
CERTIFICATE OF CORRECTION

PATENT NO. : 5,488,718    Page  2  of  2

DATED : January 30, 1996

INVENTOR(S) : Hirokazu TANAKA, et al.

It is certified that error appears in the above-indentified patent and that said Letters Patent is hereby corrected as shown below:

COLUMN 7:

Line 5, "sc" should read --so--; and
Line 59, ".and" should read --and--.

COLUMN 10:

Line 18, "i s" should read --is--.

Signed and Sealed this

Ninth Day of July, 1996

Attest:

BRUCE LEHMAN

Attesting Officer    Commissioner of Patents and Trademarks